United States Patent [19]

Nagata et al.

[11] Patent Number: 4,789,763

[45] Date of Patent: Dec. 6, 1988

[54] HORN SWITCH SYSTEM OF STEERING WHEEL

[75] Inventors: Atsushi Nagata, Nagoya; Takahiro Hashiba, Ama, both of Japan

[73] Assignee: Toyoda Gosei Co., Ltd., Nishikasugai, Japan

[21] Appl. No.: 75,069

[22] Filed: Jul. 17, 1987

[30] Foreign Application Priority Data

Aug. 21, 1986 [JP] Japan ................. 61-194059
Aug. 28, 1986 [JP] Japan ................. 61-200108

[51] Int. Cl.4 .............................. H01H 9/00
[52] U.S. Cl. ................. 200/61.54; 200/61.55
[58] Field of Search ................ 200/61.54–61.57

[56] References Cited

U.S. PATENT DOCUMENTS 2,894,090 7/1959 Timoff et al. ............... 200/61.56
4,590,340 5/1986 Koike et al. ............... 200/61.55
4,606,240 8/1986 Sakane ....................... 74/522
4,655,101 4/1987 Endo et al. ............... 200/61.55

FOREIGN PATENT DOCUMENTS

2021930 11/1971 Fed. Rep. of Germany .
58-35434 3/1983 Japan .

Primary Examiner—J. R. Scott
Attorney, Agent, or Firm—Cushman, Darby & Cushman

[57] ABSTRACT

A steering wheel horn switch system including a pad mounted in a steering wheel and having a pad leg; a pad leg receiver (5) for the pad leg; a pushup spring (3, 31) arranged concentrically with the pad leg receiver and against whose force the pad leg receiver is pushed down; a contact plate (4, 100) with a terminal (43, 46, 101); and an electrode plate (2', 20, B) with which the terminal of the contact plate comes into electrical contact when the pad is depressed and thus the pad leg receiver is pushed down.

10 Claims, 8 Drawing Sheets

HORN SWITCH SYSTEM OF STEERING WHEEL

BACKGROUND OF THE INVENTION

1. Field of the Invention

The present invention relates to a horn switch system for the horn mechanism of a steering wheel of a vehicle or ship, more particularly, to a horn switch system for the steering wheel of a car.

2. Description of the Related Art

In automobiles, the conventional practice is to springingly support a pad on the top center portion of the steering wheel for activation of a horn switch by hand depression.

This type of pad has a plurality of pad legs at suitable positions on its inner face. The legs fit into and engage with pad leg receivers on a contact plate positioned under the pad. At each pad leg position, a compressed spring is interposed between the contact plate and a boss plate positioned beneath the same around a spacer, which supports the contact plate at a different position from the pad leg receiver piece. Therefore, if the pad is depressed, the pad legs press against the contact plate at the positions of the pad leg receivers. The contact plate is pressed down against the compressed spring force along the spacers, whereupon the terminal of the contact plate comes into electrical contact with the boss plate.

In this kind of steering wheel horn switch system, since the pad mounting portion and contact plate supporting portion (spacer mounting portion) are different in position on the contact plate, even when the two portions are arranged close together, space is required for the two portions. Further, the contact plate is a thin plate made light in weight, so, depending on the distance between the position of the pressing action of the pad, that is, the pad mounting position, and the position of the pushing of the contact plate, that is, the point of the pushing up action of the spring (spacer position), a bending action will work on the contact plate at the time of pad depression obstructing smooth up-down movement of the pad.

Still further, since the pad has been mounted to the contact plate to set the contact stroke of the horn, the contact stroke of the horn becomes unstable due to the bending action of the contact plate.

SUMMARY OF THE INVENTION

It is an object of the present invention to provide a new type of steering wheel horn switch system which resolves the aforementioned defects in the related art.

The object of the present invention is achieved by a steering wheel horn switch system including a pad mounted in a steering wheel and having a pad leg; a pad leg receiver for the pad leg; a pushup spring arranged concentrically with the pad leg receiver and against whose force the pad leg receiver is pushed down; a contact plate with a terminal; and an electrode plate with which the terminal of the contact plate comes into electrical contact when the pad is depressed and thus the pad leg receiver is pushed down.

The pad leg receiver (or receivers) may be a cylindrical body having on its inner circumference a projecting engagement portion for engaging with a projecting portion of the pad leg extending from beneath the pad. The cylindrical body may be fixed at its bottom end to the contact plate and support the pad portion at its top. A coil spring arranged concentrically with the cylindrical body and around a spacer may be used to bias the pad leg receiver in a direction away from the electrode plate (upper direction).

Since the pressing force on the pad acts concentrically to the coil spring, there is no bending moment on the contact plate. Further, since the spacer mounting portion and pad leg receiving portion of the contact plate are the same in position, less space is required on the contact plate.

The object of the present invention is also achieved by steering wheel horn switch system including a pad mounted in a steering wheel and having a pad leg; a pad leg receiver for the pad leg; a mounting boss (1) in which the pad leg receiver is inserted; a contact plate abutting against the bottom of the pad led receiver and having a terminal; a contact plate pushup spring interposed between the contact plate and a base plate (10) of the mounting boss concentrically with the pad leg receiver to springingly support the contact plate; and an electrode plate with which the terminal of the contact plate comes into electrical contact when the pad is depressed and thus the pad leg receiver is pushed down.

Since the pad leg receiver and the contact plate pushup spring are arranged concentrically, the pressing force against the pad acts concentrically on the spring, so the action of up-down movement of the pad is smooth. Further, less space is used since the switch assembly is in one piece.

Further, since the switch assembly is an integral unit, it can be used for all types of steering wheels.

BRIEF DESCRIPTION OF THE DRAWINGS

The present invention will become clearer from the ensuing explanation of preferred embodiments in reference to the accompanying drawings, in which.

DESCRIPTION OF THE PREFERRED EMBODIMENTS

Before describing the preferred embodiments, a more detailed explanation of the related art will be made for reference.

Figure 1:
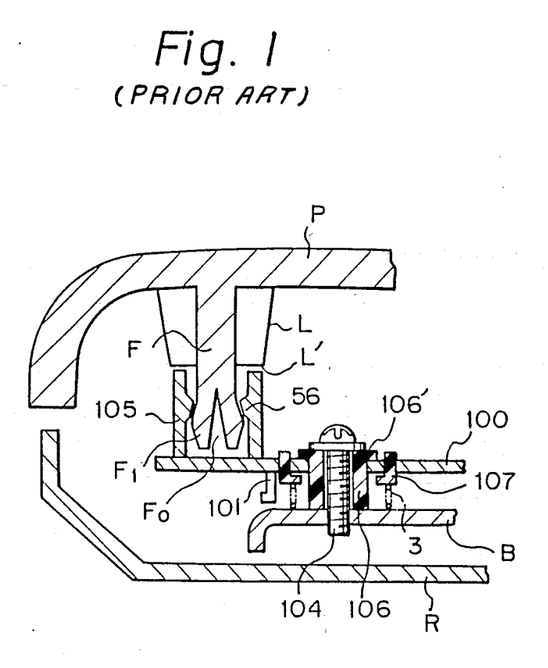
FIG. 1 is a side view of a steering wheel horn switch system of the related art.

FIG. 1 is a side view of the related art with the steering switch system mounted in steering wheel of a car.

As shown in FIG. 1, the pad P of the steering wheel has, at one portion, a pad leg F having a projecting engagement portion $F_1$ on its end and ribs L on its inner face. A projecting engagement portion 56 is formed on the inner side of a pad leg receiver 105 mounted on the top face of a contact plate 100. An electric contact 101 projects from the bottom face of the plate 100. A spacer 106 made of an insulating material is screwed on a boss plate B by a screw 104. A flange 106' at the top limits the upward movement of the contact plate 100. The contact plate 100 is supported springingly against the boss plate B by a coil spring 3 which is interposed, with an insulating material 107, between the contact plate 100 and boss plate B. The pad leg F, having a branched portion $F_0$, is inserted into the pad leg receiver 105. In this way, the pad P is mounted in place by the projecting portion $F_1$ of the leg and the projecting portion 56 of the pad leg receiver 105.

To sound the horn, one depresses the pad by hand, whereupon the bottoms of the ribs L' press down on the top of the pad leg receiver 105, which in turn presses down the contact plate 100, formed integrally with the leg receiver 105, against the spring force guided by the spacer 106. The electric contact 101 abuts against the boss plate B, which acts as an electrode plate, thereby switching the horn on.

In this type of switch construction, there were many disadvantages, already described, since the pad mounting portion and contact plate supporting portion (spacer mounting portion) were at different positions on the contact plate.

Next, embodiments of the steering wheel horn switch system of the present invention, which resolve the disadvantages of the prior art steering wheel horn switch system, will be explained.

Figure 2:
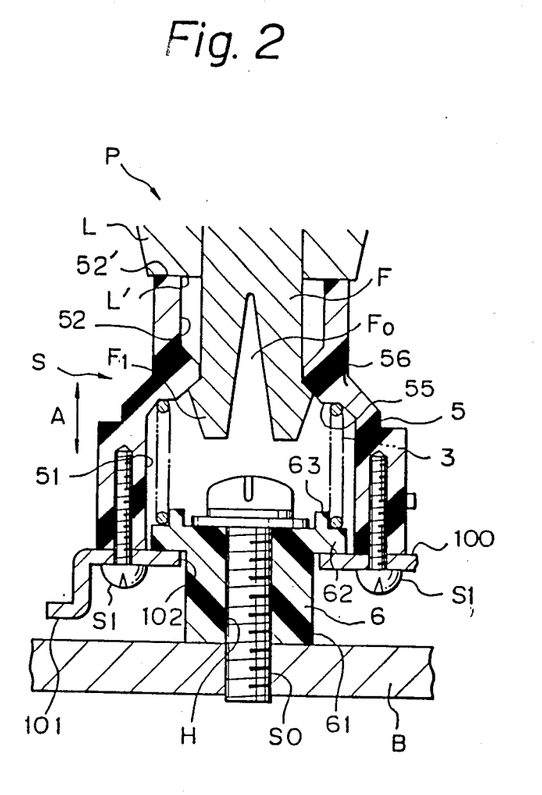
FIG. 2 is a side view of a steering wheel horn switch system of a first embodiment of the invention.

FIG. 2 is a side view of a steering wheel horn switch system according to the first embodiment. A spacer 6, comprised of a columnar portion 61, upper flange 62, concentric circular projection 63 formed on the flange and central through hole H, is formed by acrylonitrile-butadiene styrene resin (ABS resin). The mounting portion on the contact plate 100, which is made of a conductive material, has a hole 102 for receiving the columnar portion 61 of the spacer 6 and has an electrode 101, which projects bent downward near the hole.

On the other hand, a pad leg receiver 5 carried on the contact plate 100 is shaped, from ABS resin, as a lower cylinder 51 having a slightly larger inner diameter than that of the flange 62 of the spacer 6, an upper cylinder 52 having a smaller diameter than the lower cylinder, a spring support face 55, a projecting engagement portion 56 on its inner face, and a top end 52'.

When assembling the switch, the bottom of the coil spring 3 is inserted over the annular projection 63 formed on the top of the spacer 6. The top of the spring abuts against the support face 55 formed on the inner face of the pad leg receiver 5. The bottom of the pad leg receiver is fixed to the contact plate 100 by a screw $S_1$ in the state with the spring 3 compressed. Next, the screw $S_0$ is passed into the through hole H of the spacer 6 from above the pad leg receiver 5 and screwed into the boss plate B.

To affix the pad, the projecting portion $F_1$ of the pad leg F is pressed into the projecting engagement portion 56 of the pad leg receiver. The projecting portion $F_1$ is deformed inward as the branch portion $F_0$ is compressed.

In this embodiment, by depressing the pad, the bottoms of the ribs L' formed around the base portion of the leg on the inner face of the pad press down the top 52' of the pad leg receiver 5, whereby the pad leg receiver 5 compresses the coil spring 3, to move down the contact plate 100 and make the electric contact 101 (+ pole) abut against the boss plate B (− pole) to switch on the horn. Since the coil spring 3 is arranged concentrically with the pad leg receiver 5 on the spacer 6, the pad pressing force acts concentrically on the spacer 6, which is a slidingly guided column of the contact plate 100, without any bending moment. Thus, a smooth feeling of operation is obtained.

Since the spacer 6 is a single piece formed of plastic, it serves as an electrical insulator, thus eliminating the need for insulation (107 in FIG. 1) for the spring, as used in the prior art.

Further, since the pad leg receiver is cylindrical, it is easy to make it using plastic. The engagement of the projecting engagement portion 56 with the pad leg is facilitated, and the top 52' can receive correctly the pressing force of the pad.

In the horn switch system of this embodiment, since the supporting portion of the contact plate 100 on the boss plate B (spacer mounting position) and pad mounting portion (pad leg receiver position) are the same, the space occupied on the contact plate is small.

Figure 3A:
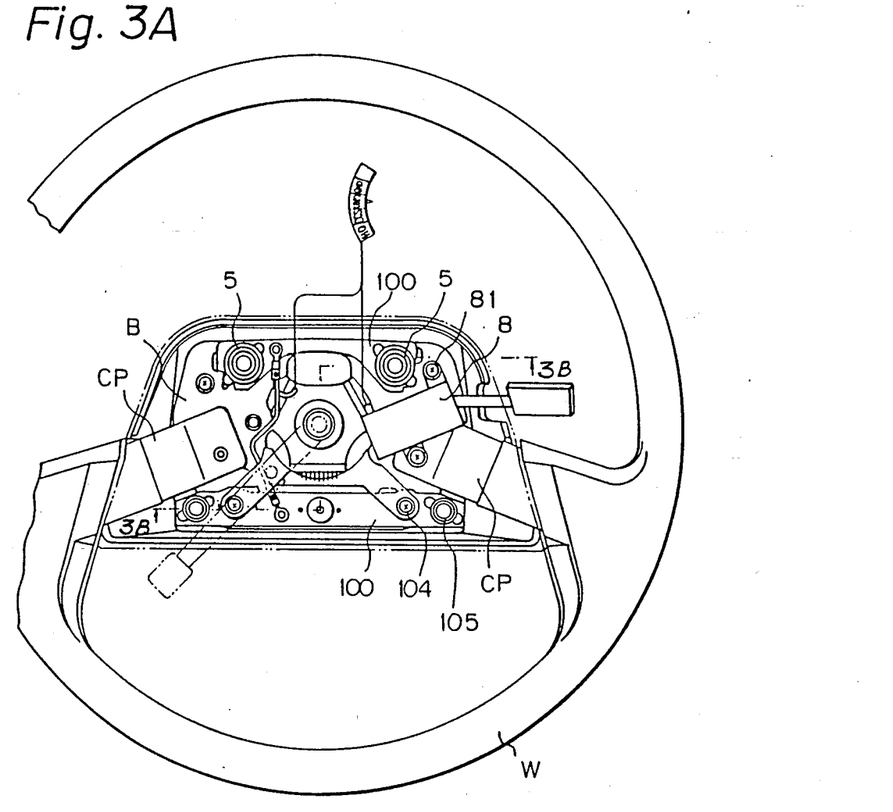
FIG. 3A shows the state of use of the horn switch system shown in FIG. 2 for a steering wheel.
Figure 3B:
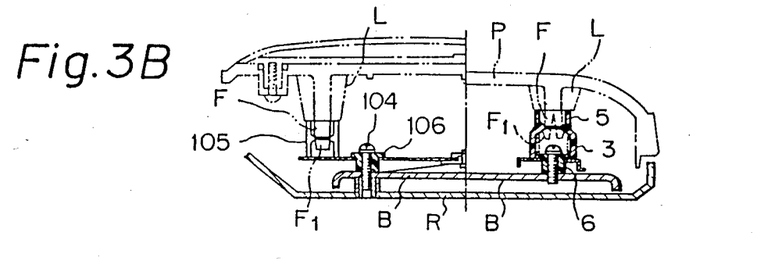
FIG. 3B is a sectional view taken along line 3B—3B of FIG. 3A.

FIGS. 3A and 3B show an example of use of the horn switch of this embodiment in a steering wheel. As shown in FIG. 3A, the contact plate is split into two parts. Horn switches of this embodiment are mounted at the upper (in FIG. 3A) short plate. Prior art horn switches (of FIG. 1) are used for the lower long plate as shown at the left in FIG. 3B. Thus, space is created at the middle of the top face of the boss plate B. In that space, the spoke core metal CP extending from the steering wheel W is mounted. An auto-drive switch 8 is also attached thereby screw 81.

In this way, while the horn switch of this embodiment is assembled to the prior art type of contact plate and boss plate, it can be mounted on a small space, so can be used together with the prior art switches and creates new space on the prior art boss plate or contact plate.

Figure 4A:
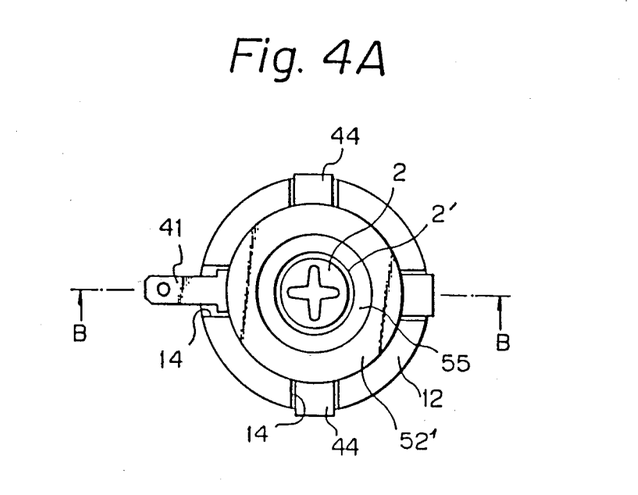
FIG. 4A is a plane view of a second embodiment of the invention.
Figure 4B:
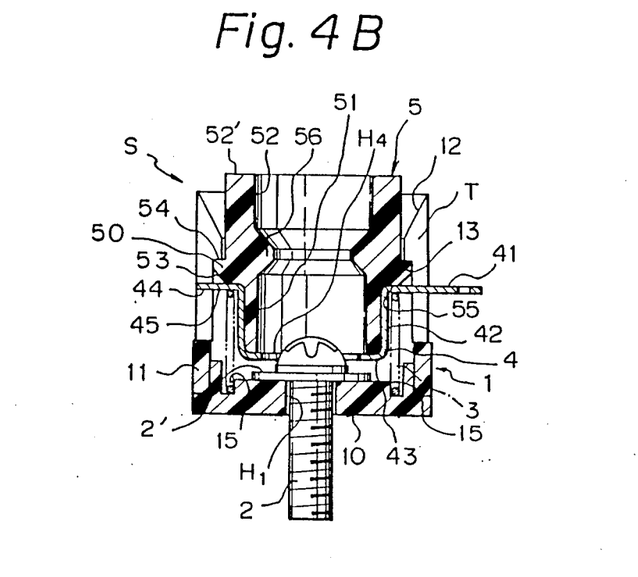
FIG. 4B is a sectional view taken along line 4B—4B of FIG. 4A.
Figure 4C:
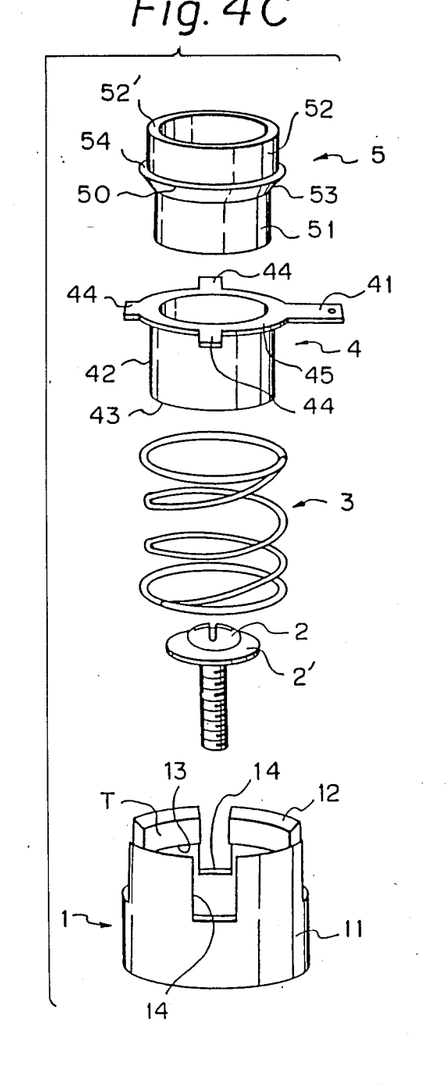
FIG. 4C is an exploded perspective view.

A second embodiment will now be explained referring to FIGS. 4A, 4B, and 4C. In this embodiment pad leg receiver 5, which is capped from below by the contact plate 4, made of a conductive material, is inserted into a cylindrical container shaped mounting boss 1 made of an insulating material. A compressed coil spring 3 is interposed between the contact plate 4 and a base plate 10 of the mounting boss. A screw 2 with a washer 2', comprising an electrode is inserted into a hole $H_1$ through the center of the base plate 10 of the mounting boss 1.

The mounting boss 1 is made by ABS resin. It has the base plate 10 and a circular side wall 11 with four equally spaced slits 14 for enabling it to deform and open. The upper portion of the side wall 11 is made thicker and has a taper 12 inclined inwardly. There is an engagement face 13 on bottom of the thick portion. An annular groove 15 for supporting a spring is provided along the inner side of the side wall 11 on the inner face (top face) of the base plate 10.

The pad leg receiver 5 is made by ABS resin. It has a lower cylinder 51 and upper cylinder 52. An annular projection 50 is provided with an upper engagement face 54, taper 53, and contact plate supporting face 55 at the center of the outer circumference of the receiver 5. There is further an annular projecting portion 56, for engaging the projecting engagement portion $F_1$ (FIG. 1) of the pad leg, at center portion of the inner circumference of the receiver 5.

The contact plate 4 is made by steel plate. It is formed by pressing to a roughly U-like section having a cylinder portion 42. A center hole $H_4$ is provided in the bottom 43, which bottom serves on a terminal. Also provided are three projecting pieces 44 and one cord connecting piece 41 for engaging with the slits 14 of the mounting boss 1 on the top flange 45.

The coil spring 3 is made by piano wire and is coiled four times.

The space between the washer 2' held by the screw 2 and the contact plate bottom face 43, that is, the contact stroke, is set to 1.5 mm. The washer 2' is made larger in diameter than the center hole $H_4$ of the contact plate bottom face 43.

In assembling the switch, the sliding action of the taper 12 of the mounting boss 1 and the taper 53 of the pad leg receiver 5 and the opening action of the slits 14 of the circular side wall 11 of the mounting boss 1 facilitate insertion of the pad leg receiver 5 into the mounting boss. Further, since the spring 3 is held stably between the annular groove 15 of the base plate 10 and the flange 45 of the contact plate 4 and since the base plate 10 is an insulator, no insulation is required for the spring like in the prior art switch (107 in FIG. 1). Still further, as the electrode plate is the washer 2', which has a larger diameter than the center hole $H_4$ of the contact plate, the switch can be mounted to the boss plate B simply by a single screw 2.

Figure 5A:
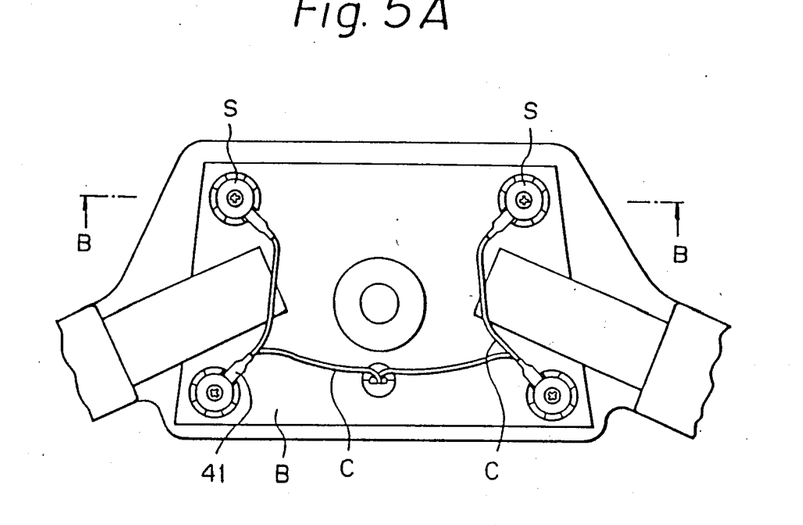
FIG. 5A is a view showing the use of the steering wheel horn switch system of the second embodiment but with the pad removed.
Figure 5B:
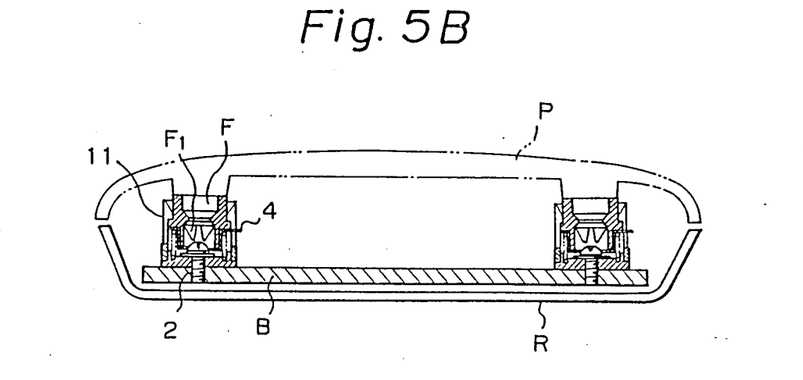
FIG. 5B is a sectional view taken along line 5B—5 in FIG. 5A.
Figures 6A, 6B, 6C:
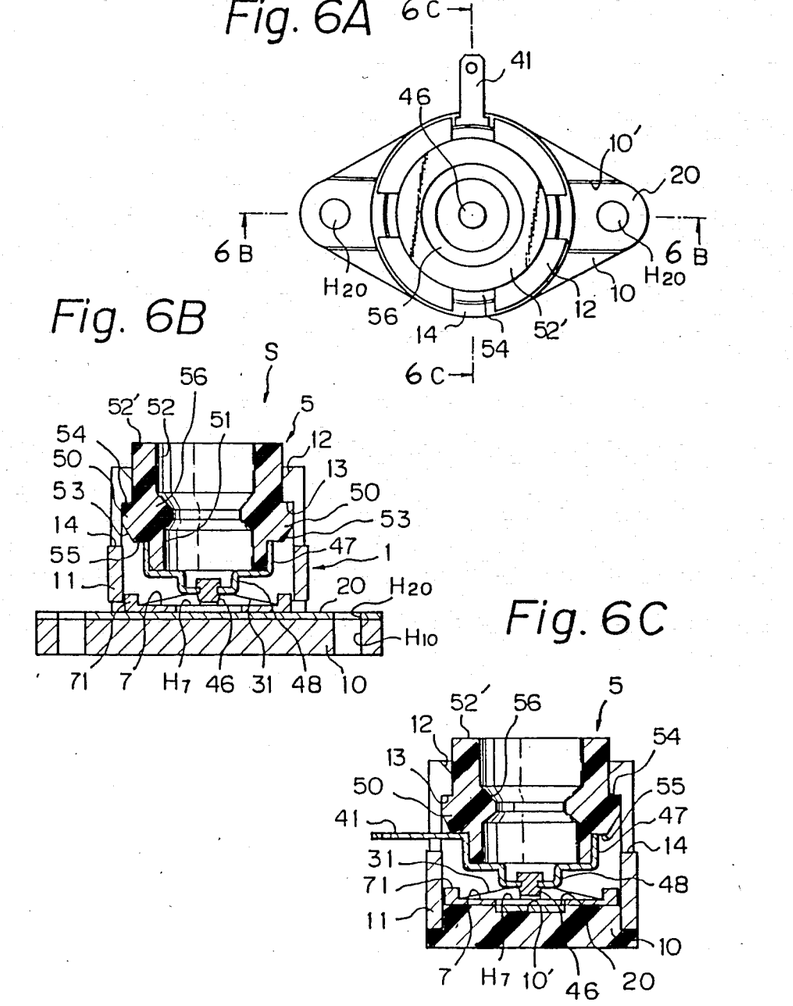
FIG. 6A is a plane view of a third embodiment of the invention.
FIG. 6B is a sectional view taken along line 6B—6B.
FIG. 6C is a sectional view taken along line 6C—6C.
Figure 6D:
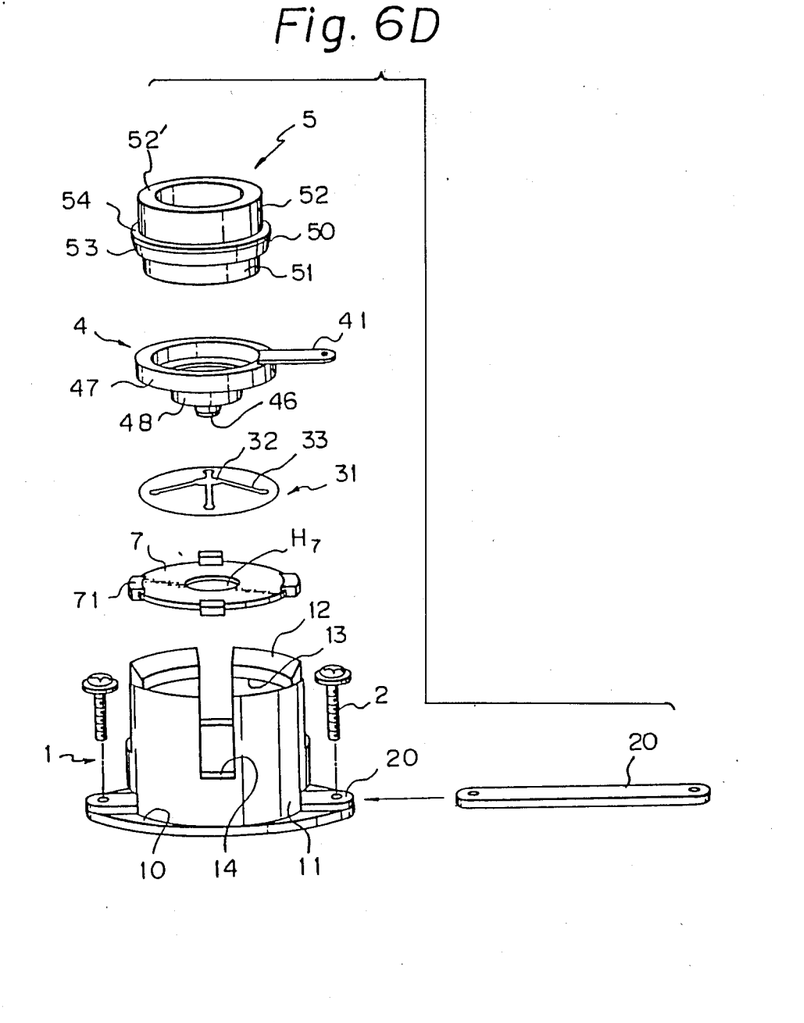
FIG. 6D is an exploded perspective view.

In use, a suitable number of the above switches are affixed to the boss plate B at appropriate locations by screws 2, as shown in FIGS. 5A and 5B. The connection pieces 41 of the contact plates 4 of the switches are connected by the cords C. The pad leg receivers 5 of the switches on the boss plates B have inserted therein the front projecting portions F1 of the pad legs F, whereupon the projecting portions F1 deform due to the slits F0 (FIGS. 1, 2).

The switches are connected just by the cords C. For example, this does not block mounting of the spoke core metal on the boss plate, so the space can be freely used. Further, since the switches abut against the inside surface of the pad, the on-off operation of the switches is not hindered by the cords.

A third embodiment is shown in FIGS. 6A, 6B, 6C, and 6D. The mounting boss 1, made by ABS resin, is formed as a cylindrical container constituting a base plate 10, having a groove 10' across the center of its surface for receiving a steel washer 20, four slits 14 for opening purposes, and on its top, a sliding taper 12 and engaging face 13.

The pad leg receiver 5, made of ABS resin, is formed like that of the second embodiment, that is, constitutes a lower cylinder 51; upper cylinder 52; a annular projection 50, having an engaging face 54, taper 53, and contact plate supporting face 54, at the center portion of its outer circumference; and an annular projecting portion 56 at the center portion of its inner circumference for engaging with the pad leg.

The contact plate 4, made of steel plate, is shaped as a large diameter annular belt portion 47 and small diameter annular belt portion 48 formed by a two-step reducing press. It has a terminal 46 held at the center of the bottom face of the small diameter annular belt portion 48.

A spring 31 is formed from a tool steel sheet disc which is bulged conically outward and provided at its center with a hole 32 for the terminal 46 and radially from the hole 32 a plurality of slits 33 for allowing deformation of the disc.

An insulating spring supporting disc 7 is provided made of ABS resin and having a hole $H_7$ at the center. It is of a size allowing insertion on the inside bottom plate 10 of the mounting boss 1 and has spring 31 support hook pieces 71 at four points on its outer circumference.

The spring supporting disc 7 may be formed integrally with the base plate 10 of the mounting boss 1.

In assembling the switch, the steel electrode plate 20 is inserted into the groove 10' of the bottom plate 10 of the mounting boss 1. The spring supporting disc 7 is inserted on the electrode plate 20 of the bottom of the mounting boss 1, and the spring 31 is supported on the spring supporting disc 7 by the hook pieces 71.

Next, the large diameter annular belt portion 47 of the contact plate is fit into the outer circumference of the lower cylinder 51 of the pad leg receiver 5, and the pad leg receiver 5 pressed in from the upper portion of the mounting boss 1, whereupon the sliding between the tapers 53 and 12 and opening of the cylinder upper portion of the mounting boss due to the slits 14 enable the pad leg receiver 5 to be set into the mounting boss 1.

The terminal 46 at the center bottom of the contact plate 4 projects downward from the spring center hole 32. The pad leg receiver 5 is held in the state with its engaging face 54 abutting the engagement face 13 of the mounting to boss 1 by the pushup force of the spring 31 via the contact plate 4.

In use, as in the case of the second embodiment, the base plate 10 of the mounting boss and the electrode plate 20 are aligned so their holes $H_{10}$ and $H_{20}$ overlap, then are fixed by the screw 2 at a suitable position of the boss plate B. The leg projecting engagement portion $F_1$ of the pad P is then pressed into the pad leg receiver 5.

In this embodiment, as the mounting boss base plate 10 is fixed at its two projecting ends, the switch can be fixed more securely to the boss plate than in the second embodiment. Also, as the spring is a diaphragm-like flat spring 31 deformed to a conical shape, it gives a better feel than the coil spring 3 in the second embodiment.

The horn switch system of the present invention may be used for many types of steering wheel horn mechanisms. It reduces the design limitations of horn switch mechanisms steering wheels and also the design work.

Further, since the unit switch can be used in common for many types of the steering wheel, the number of parts required to be stocked by a manufacturer can be reduced.

As the horn switch mechanism can be pre-assembled, the precision of the contact stroke of the switches rises, facilitating assembly into the steering wheel and enabling automatic assembly. Further, maintenance and administration of parts become easy.

In the above embodiments, the pad leg receivers 5 were circular cylinders, but they may also be square cylinders. In short, it is only necessary that the pad leg receiver and spring be concentric.

We claim:

1. A steering wheel horn switch system comprising:

a pad mounted in a steering wheel and having a pad leg;

an electrode plate mounted in the steering wheel;

a contact plate mounted in the steering wheel and having a terminal;

a pad leg receiver for said pad leg, said pad leg receiver being cylindrical and having a projecting engagement portion on an inner circumference thereof for engaging a projecting portion of the pad leg, said pad leg receiver being fixed at a lower end thereof and supporting at an upper end thereof a portion of said pad; and a push up spring mounted concentrically with said pad leg receiver, intermediate said pad leg receiver and said electrode plate whereby said pad leg receiver is pushed down against the force of said push up spring;

whereby said terminal of said contact plate comes into electrical contact with said electrode plate when the pad is depressed and the pad leg receiver is pushed down.

2. A steering wheel horn switch system as claimed in claim 1, wherein the contact plate abuts against the bottom face of a top flange of a spacer on the electrode plate, and a coil spring is interposed in a compressed state between the upper face of said flange and a supporting face of the bottom face of said projecting engagement portion.

3. A steering wheel horn switch system as claimed in claim 2, wherein the spacer and pad receiver are integral pieces formed of a synthetic resin.

4. A steering wheel horn switch system comprising:

a pad mounted in a steering wheel and having a pad leg;

a pad leg receiver for said pad leg;

a mounting boss in which said pad leg receiver is inserted;

a contact plate abutting against the bottom of the pad leg receiver and having a terminal;

a contact plate pushup spring interposed between said contact plate and a base plate of said mounting boss concentrically with said pad leg receiver to springingly support said contact plate; and an electrode plate with which the terminal of said contact plate comes into electrical contact when the pad is depressed and thus the pad leg receiver is pushed down.

5. A steering wheel horn switch system as claimed claim 4, wherein the contact plate is provided at one end with a cord connection piece for one electrode, and, the electrode plate, being, electrically connected to the steering wheel core metal by a switch screw 2.

6. A steering wheel horn switch system as claimed in claim 4, wherein the mounting boss is a cylindrical container made of synthetic resin and has the base plate and a circumferential side wall with a plurality of slits for enabling deformation and opening, said side wall having a thick portion provided at its top with a taper portion inclined inwardly and at its bottom with an engaging face, and the pad leg receiver has at a center of the inner circumference a projecting engagement portion for engaging with a projecting portion of the pad leg defined at a center of the outer circumference and consisting of an upper engaging face taper, and contact plate supporting face the receiver being cylindrical in shape and concentric with the side wall of the mounting boss.

7. A steering wheel horn switch system as claimed in claim 6, wherein a coil spring is interposed in a compressed state concentrically with the pad leg receiver between an annular groove, which is provided along an inner face of the side wall on an upper face of the base plate and a flange of the contact plate, which abuts against and is supported by the contact plate supporting face of the pad leg receiver.

8. A steering wheel horn switch system as claimed in claim 5, wherein the contact plate has a cylinder portion, flange-like terminal formed by a bottom center hole, and a plurality of projecting pieces and one cord connecting piece projecting from an upper flange for engaging with slits of the mounting boss and the electrode plate is a washer set on an upper center portion of the mounting boss base plate and is larger in diameter than said center hole.

9. A steering wheel horn switch system as claimed in claim 6, wherein a diaphragm-like flat spring, made by a conically expanded tool steel sheet having at its center a hole for insertion of a terminal and having slits formed radially from the hole, is interposed between a spring supporting disc, made of an insulator, having a hole in its center and inserted on an upper face of the mounting boss base plate, and bottom face of the contact plate which is supported by the pad leg receiver.

10. A steering wheel horn switch system as claimed in claim 9, wherein the terminal of the contact plate projects downward from the hole of the flat spring, and the electrode plate is arranged below the hole of the spring supporting disc.

* * * * *